Aug. 4, 1970 H. GORDON 3,522,652

METHOD OF MAKING AN ELECTRICAL CIRCUIT ASSEMBLY

Filed Sept. 15, 1967 2 Sheets-Sheet 1

Inventor:
Herman Gordon,
by Robert R. Churchill
Attorney

Inventor:
Herman Gordon
by Robert R. Churchill
Attorney

United States Patent Office 3,522,652
Patented Aug. 4, 1970

3,522,652
METHOD OF MAKING AN ELECTRICAL CIRCUIT ASSEMBLY

Herman Gordon, Maricopa, Ariz., assignor to Rogers Corporation, Rogers, Conn., a corporation of Massachusetts Filed Sept. 15, 1967, Ser. No. 667,939
Int. Cl. H02g 15/00
U.S. Cl. 29—629 6 Claims

ABSTRACT OF THE DISCLOSURE

Flat flexible insulated electrical cable having a plurality of parallel conductors is provided with a terminating device molded thereto wherein the insulation of the flexible cable is mechanically removed from one side of the flat cable prior to assembly with the terminating device. After assembly, portions of the conductors from which the insulation has been previously removed on one side are exposed through openings in the terminating device for connection to a corresponding receptacle.

BACKGROUND OF THE INVENTION

Field of the invention

The present invention relates to a method of making electrical circuit assemblies for the termination and connection of flexible electrically conductive and insulated conductors and may be used with advantage in any of the applications commonly associated with flat conductor cable.

Description of the prior art

The present invention comprises an improvement on the electrical circuit assembly and method illustrated and described in the United States patent to Lawrence R. Travis, No. 3,278,887, issued Oct. 11, 1966. The method of manufacturing an electrical circuit assembly defined in the patent involves the construction of the cable by the continuous coating on one side of a metal foil with an aromatic amide-imide polymer insulation. Parallel conductor patterns are then continuously printed with a resist on the metal surface, unwanted metal is removed by etching and the resist removed. The cable is completed by laminating a film onto the open face of the conductors with an adhesive.

The terminal or terminals are then molded in place, the terminal end of the flat cable being folded on a mandrel and placed in the mold cavity. Core pins in the mold keep contact areas on the cable free of mold compound and provide windows exposing contact area portions of selected cables covered with the aromatic amide-imide polymer insulation. The contact areas are then cleared of the amide-imide insulation by a rapid chemical process which does not affect either the terminal material or the conductor insulation within the terminal. One of the disadvantages of the above described method of manufacturing a flat cable assembly is that the process is limited to a particular type of insulation capable of being chemically removed without injury to the terminal material.

SUMMARY OF THE INVENTION

Briefly, the present invention contemplates a method of providing an electrical circuit assembly comprising a flat flexible cable to which a terminal member is molded after the insulation has been removed from one side of the flat cable wherein the terminal member is provided with openings aligned with selected conductors and which leave exposed the surfaces of the conductors which form the contact areas of the terminal member.

Accordingly, it is an object of the present invention to provide a novel and improved method of manufacturing an electrical circuit assembly having a flat flexible cable and a terminal member in which the insulating material is not limited to a particular insulating covering material which must be removed by a chemical process.

Thus, the advantage of the present invention is that it permits the utilization of a wide variety of insulating materials in the manufacture of the flat flexible cable and the terminal member.

Other objects and attendant advantages of the present invention will be readily apparent from the following detailed description, when taken in conjunction with the accompanying drawings, wherein:

DESCRIPTION OF PREFERRED EMBODIMENTS

Figures 1, 2, 3:
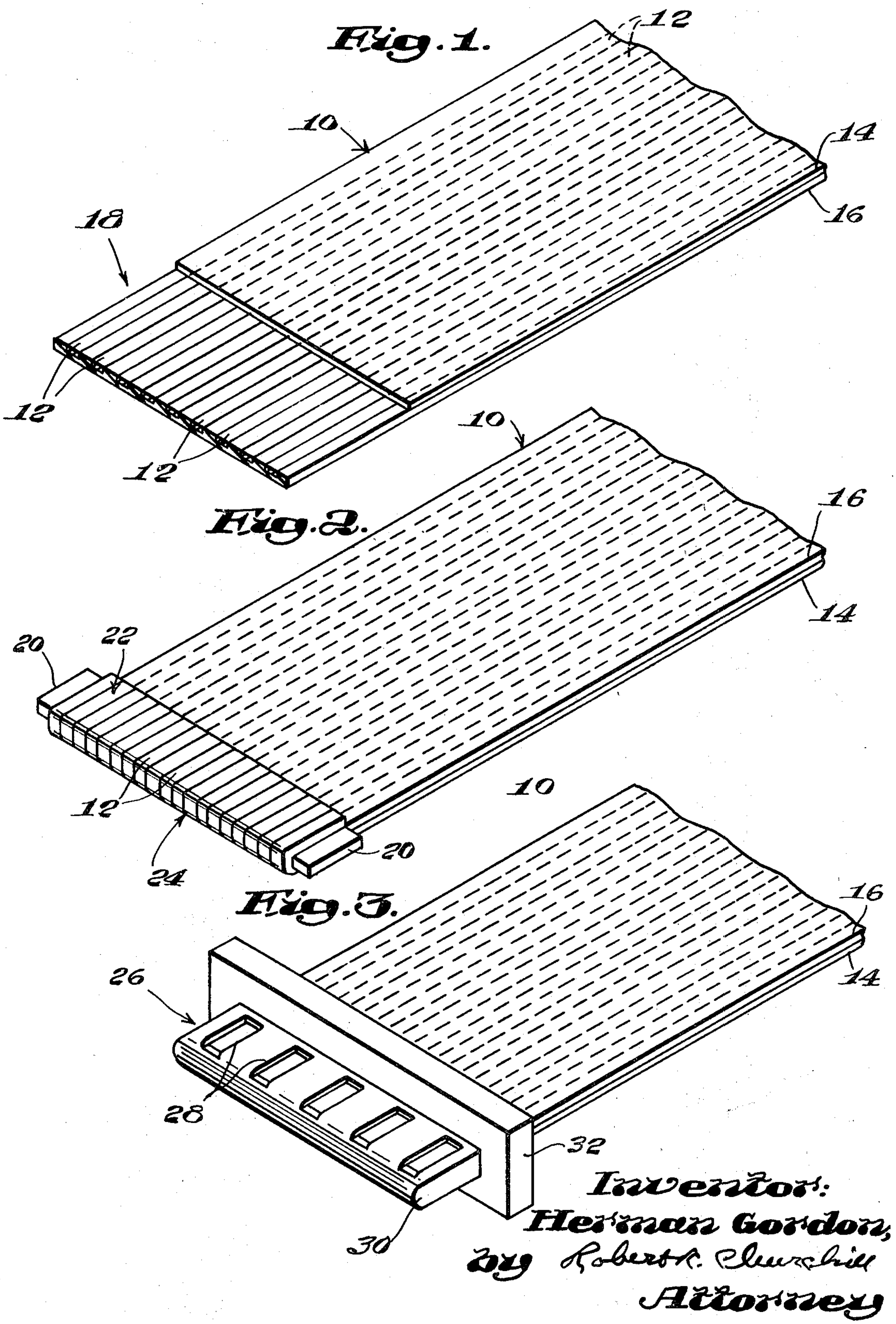
FIG. 1 is a perspective view of a length of flat flexible insulating cable in which the insulation has been removed from one side of the terminal end of the cable.
FIG. 2 is a perspective view of the cable end folded about a mandrel with the bared contact areas facing outwardly.
FIG. 3 is a perspective view of the completed circuit assembly with a terminal member molded about the mandrel.

Referring now to FIGS. 1, 2 and 3, there is illustrated a flat flexible conductive cable 10 comprised of a plurality of elongated electrically conductive elements 12 of copper or other suitable material sandwiched between two electrically insulating layers 14 and 16 of suitable insulating materials. In the specific embodiment shown, there are nine conductors 12 in the cable 10.

In accordance with the present invention, the insulation is mechanically removed from one side, herein shown as the upper surface 14, only of the terminating end 18 of the flexible cable 10 to expose the bared conductive elements 12, the insulation 16 on the lower surface and extended between the conductive elements 12 being retained to maintain dimensional positioning of the conductors which are used as contact elements. The face of the terminating end 18 of the cable with the insulation intact is then folded around and bonded to a mandrel 20, as illustrated in FIG. 2, providing upper and lower contact surfaces 22 and 24 respectively.

Figure 5:
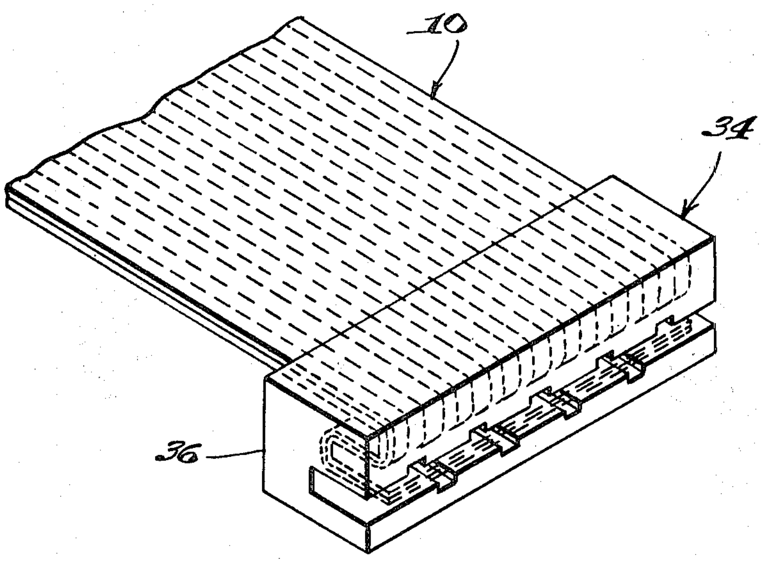
FIG. 5 is a perspective view of a female connector or terminal device.

This mandrel assembly with the bared or open face cable is then positioned in an encapsulating mold by which the assembly is molded within a termination body 26 in a manner similar to that illustrated and described in the United States patent to Lawrence R. Travis, No. 3,278,887, assigned to the same assignee. In practice, the encapsulant or molding material may comprise an epoxy or other material with good adherence to the copper and plastic of the mandrel assembly. The molding operation provides windows or openings 28 in the termination body 26 over portions of selected of the previously bared conductors, the exposed portions comprising the contacting members. The termination body 26 provides a male termination member including an insert portion 30 and a base portion 32. In FIG. 5 is illustrated a female connector 34 which is also manufactured by molding the flexible cable end portion into a body 36 after the insulation has been mechanically removed from one side of the end portion, such as by an abrading or grinding operation.

After molding the assembly is deflashed from the small quantity of molding material which may remain on the conductors. This flashing may be performed by sandblasting with a nutshell or other very lightly abrasive material. In operation, the exposed copper is provided with a suitable electrical contact area comprising a layer of nickel and then a layer of gold on top of the nickel layer in accordance with conventional practice as shown.

From the description thus far, it will be seen that the principal advantage of the above described method of making an electrical circuit assembly over the prior method disclosed in U.S. Pat. No. 3,278,887 is that any plastic film insulation may be used for the flat cable, and such insulation does not have to be limited to a plastic film which can be chemically removed, although such insulation is not excluded in the present method. Thus, the advantage of the present method is the utilization of a wide variety of cable insulating materials including polyamide or polyamide-imide polymers, polytetrafluorethylene, PVC, flexible thin laminates, such as those made from glass cloth and epoxy resin, or even coatings of various plastics, such as phenolic varnishes or epoxy resins.

Actually, any suitable insulating material may be used provided it is flexible and also has satisfactory electrical properties for the service in which the cable is to be used. The only limitations to the use of a particular insulating material would be the temperature resistance of the particular material which in turn would dictate the type of molding material used in order to encapsulate the mandrel assembly. When it is desired to do the molding upon very low temperature material, such as the vinyl materials, an injection molding process could be used which essentially deals with a reasonably cold mold. Another alternate to this could be the liquid casting which can be done in a cold mold which of course would then be cured at room temperature.

Figure 4:
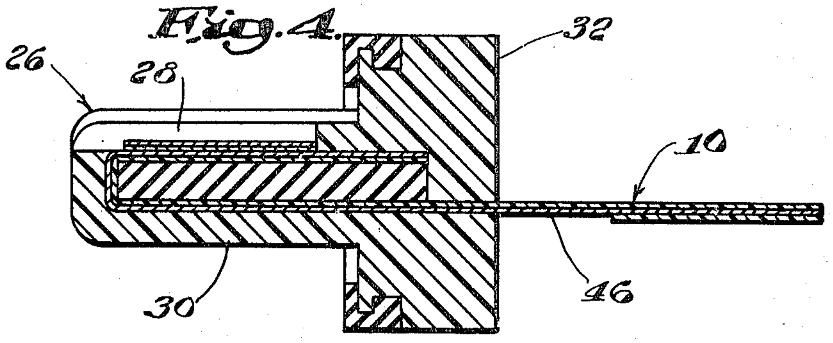
FIG. 4 is a cross sectional view of the terminal assembly.
Figure 6:
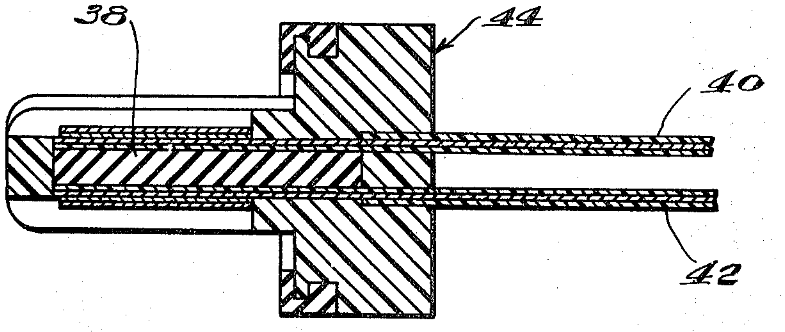
FIG. 6 is a cross sectional view similar to FIG. 4 showing a modified form of electrical circuit assembly embodying two flexible cables.

In a modified form of circuit assembly, as illustrated in FIG. 6, the mandrel 38 has two separate cables 40 and 42 bonded to the upper and lower surfaces thereof prior to being molded within the terminal member 44. It will be understood that in this form of the invention the insulation also has been previously mechanically removed from one side only of the terminal end of each separate cable. In some instances, it may be of advantage to remove the insulation from one side of the terminal end to a distance such as to extend beyond the back of the terminal member 44 in the assembly, as indicated at 46 in FIG. 4, where the exposed conductors may be connected in any usual or preferred manner to continue the circuit as required.

In addition to the advantage of the ability to use molding methods employing insulation which is not etchable, the product produced by the present method has all the advantages of the product produced by the method disclosed in Pat. No. 3,278,887 above referred to. Another important advantage afforded by the present method is that it allows electrical inspection of the terminal end of the cable prior to molding.

Although the above description relates particularly to flat cable provided with relatively thin flat foil conductors, it will be apparent that the present invention may be practiced with equal advantage by using a flat cable having a plurality of standard round wires or flattened wires encased between flat plastic strips. It will also be apparent that the contact areas exposed in accordance with the present invention may be preselected to register with specific areas, such as the terminal window openings 28.

In practice, the terminal members may be molded in place at any desired point on the cable and in any number, an intermediate portion of the cable being merely folded about a mandrel and provided with a molded terminal member. Obviously, the cable may be prepared in accordance with the present invention at such preselected points to receive the terminal members at such intermediate points.

While the preferred embodiments of the invention have been herein illustrated and described, it will be understood that the invention may be embodied in other forms within the scope of the following claims.

Having thus described the invention, what is claimed is:

1. The method of manufacturing an electrical circuit assembly comprising the steps of:

providing a flat flexible circuit cable having a plurality of substantially parallel coplanar conductors covered on both sides with an insulating material;

mechanically removing the insulation on one side at the terminal end of the cable to expose the conductors;

folding the exposed end of the cable over a mandrel having upper and lower surfaces with the exposed faces of the conductors facing outwardly;

forming an insulating body about the mandrel and the terminal end of the cable and providing openings in said body over the exposed portions of said conductors;

deflashing the exposed portions of the cables aligned with said openings by sandblasting with a lightly abrasive material.

2. The method as defined in claim 1 wherein the step of mechanically removing the insulation comprises an abrading operation.

3. The method as defined in claim 1 wherein the flexible cable insulation comprises a plastic film of a non-etchable material on both sides of the conductors.

4. The method as defined in claim 1 wherein the formed insulating body is of a plastic material not resistant to chemical action.

5. The method as defined in claim 1 wherein a portion of the flexible cable from which the insulation has been removed on one side extends outside of the insulating body to provide exterior exposed conductors adapted for connection to continue a circuit.

6. A method of manufacturing an electrical circuit assembly comprising the steps of:

providing a pair of flat flexible circuit cables having a plurality of substantially parallel coplanar conductors covered on both sides with an insulating material;

mechanically removing the insulation from one side only of one end of each of the cables to expose the surfaces of the conductors therein;

bonding the said one ends of said cables to opposite sides of a mandrel having upper and lower surfaces with the exposed surfaces of the conductors facing outwardly;

forming an insulating body about the mandrel and the said one ends of the cables; and providing openings in said insulating body over exposed portions of said conductors of said cables.

References Cited

UNITED STATES PATENTS

| | | | |
|---|---|---|---|
| 2,963,392 | 12/1960 | Dahlgren. | |
| 3,079,458 | 2/1963 | Hedstrom. | |
| 3,159,447 | 12/1964 | Crimmins et al. | |
| 3,258,831 | 7/1966 | Angela et al. | 29—629 |
| 3,278,887 | 10/1966 | Travis. | |
| 3,404,454 | 10/1968 | Sayles | 29—629 |

CHARLIE T. MOON, Primary Examiner
R. W. CHURCH, Assistant Examiner

U.S. Cl. X.R.

264—272; 339—17